C. E. LAHMERS.
AUTOMATIC CUT-OFF FOR GAS MAINS.
APPLICATION FILED MAR. 9, 1909.
942,832.
Patented Dec. 7, 1909.
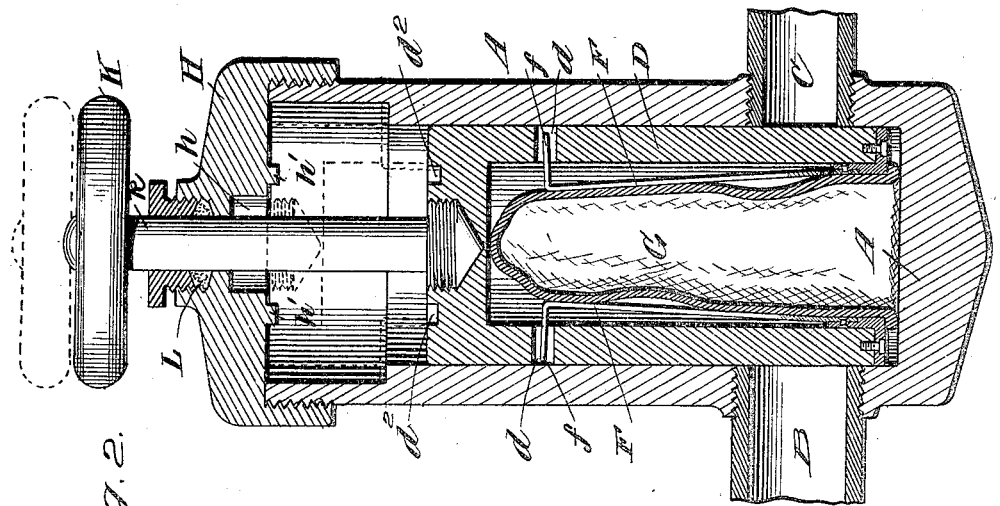
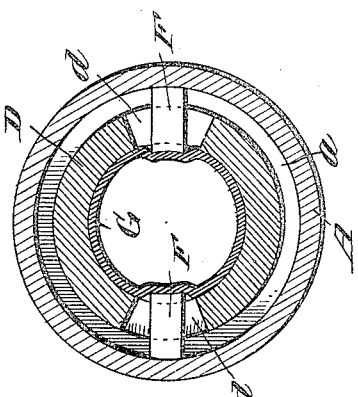
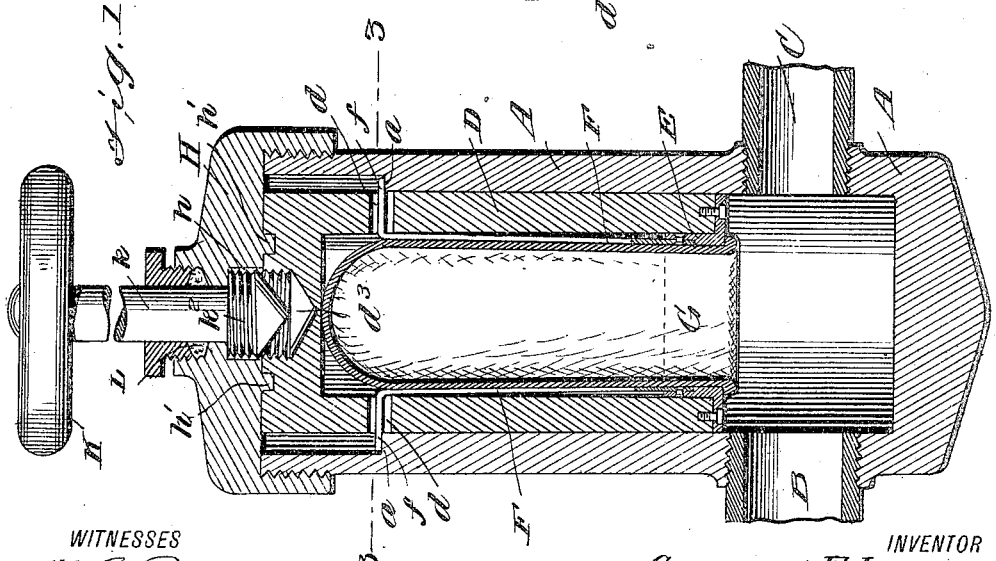
WITNESSES
INVENTOR
CHARLES E. LAHMERS
BY
ATTORNEYS

UNITED STATES PATENT OFFICE.

CHARLES E. LAHMERS, OF NEW PHILADELPHIA, OHIO.

AUTOMATIC CUT-OFF FOR GAS-MAINS.

942,832.

Specification of Letters Patent. Patented Dec. 7, 1909.

Application filed March 9, 1909. Serial No. 482,299.

*To all whom it may concern:*

Be it known that I, CHARLES E. LAHMERS, a citizen of the United States, and a resident of New Philadelphia, in the county of Tuscarawas and State of Ohio, have made certain new and useful Improvements in Automatic Cut-Offs for Gas-Mains, of which the following is a specification.

My invention relates to devices for preventing explosions or accidents caused by changes in the pressure in gas mains, and it consists in the constructions, combinations and arrangements herein described and claimed.

It often happens that the pressure on the mains of a city gas system becomes so low that at times the flow of gas from the jets communicating therewith is stopped altogether. This is especially true of the burners of gas stoves and the like, which, when left burning, will frequently go out at certain periods of the day when the pressure is low. If the cocks are not turned off, the gas begins to flow when the pressure comes on again and there is danger of an explosion when the gas is again lighted or the freely flowing gas itself is liable to fill the house or apartment with its poisonous fumes.

An object of my invention is to provide a device which will automatically shut off the flow of gas from the mains when the pressure therein becomes too low, thereby preventing the accidents which might otherwise occur.

A further object of my invention is to provide a device of few parts and of comparatively little cost for accomplishing the above results.

Further objects and advantages will appear in the following specification and the novel features of the invention will be particularly pointed out in the appended claims.

My invention is illustrated in the accompanying drawings, in which—

Figure 1 is a central vertical section through the device showing it in an open position. Fig. 2 is a similar view showing the device in a closed position, and Fig. 3 is a horizontal section along the line 3—3 of Fig. 1.

In carrying out my invention I provide a main casing A, preferably of a cylindrical form having an inlet opening B and an outlet C near the bottom thereof. Within the casing A is a hollow cylinder D closed at its upper end and provided with lateral slots $d$. The lower end of the cylinder D is provided with an annular ring E, to which are secured the springs F whose upper ends are bent at $f$ to project into the slots $d$. The normal position of these springs is shown in Fig. 2. Within the cylinder D is disposed a resilient member G which is sufficiently flexible to be expanded by ordinary gas pressure.

The top of the casing A is closed by a screw threaded cap H, having a recess $h$, and provided with lugs $h'$ arranged to engage in slots $d^2$ in the upper end of the cylinder D. K is a handle which has a stem $k$ that extends downwardly through the cap and is provided on its lower end with a threaded member $k^2$ arranged to enter the threaded recess $d^3$ in the top of the cylinder D. A packing gland L is provided to prevent the escape of gas.

From the foregoing description of the various parts of the device the operation thereof may be readily understood. The cut-off may be located at any convenient place but is preferably placed in a building between the meter and the distributing pipes. The device is normally arranged as shown in Fig. 1. It will be seen that the cylinder D is suspended within the casing A by the engagement of the spring ends $f$ with the shoulder $a$ of the outer casing. The gas enters the inlet B and keeps the resilient member G expanded so as to press the springs outwardly. Now when the pressure becomes low the member G is deflated, the springs resume their normal position, withdrawing from the shoulder $a$ and permitting the cylinder D to descend, thereby closing the openings B and C and stopping the flow of gas, as clearly shown in Fig. 2. When it is desired to start the flow again, after the pressure comes on, the handle K is depressed, until the head $k^2$ enters the recess $d^3$. A few turns of the handle secures the latter to the cylinder top and the cylinder may be drawn up into the position shown in Fig. 1. Since the pressure is on, the springs will again engage the shoulder $a$ and hold the cylinder suspended. The handle may then be unscrewed from the cylinder top (the lugs $h'$ preventing the cylinder from turning) and the device will be set ready for cutting off the flow again should the pressure decrease.

I am aware that other forms of the device based upon the same general principle might be made, but I consider as my own all such modifications as fairly fall within the spirit and scope of the invention.

I claim:

1. An automatic cut-off comprising a casing provided with openings for the admission and exit of gas, a slidable cylinder disposed within said casing, spring means secured to said cylinder and arranged to engage over a portion of said casing for suspending the cylinder and a collapsible member secured to said cylinder and arranged to keep said suspending means normally in engagement with said casing when the pressure is on and to release said suspending means from said casing when the pressure decreases.

2. An automatic cut off comprising a casing provided with openings for the admission and exit of gas, a slidable cylinder disposed within said casing, springs secured to said cylinder and arranged to engage said casing, and a collapsible member secured to said cylinder and arranged to keep said springs normally in engagement with said casing when the pressure is on, and to release said springs from said casing when the pressure decreases.

3. An automatic cut off comprising a casing provided with openings for the admission and exit of gas, a slidable member disposed within said casing and provided with slots, springs secured to the inner side of said cylinder and having portions adapted to extend through said slots and to engage said casing, a collapsible member secured within said cylinder and arranged to keep said springs in an extended position when the gas pressure is on, and to collapse when the gas pressure is reduced, thereby permitting the retraction of said springs and their disengagement from the casing and allowing the cylinder to descend and to close simultaneously, the openings for the admission and the exit of gas.

CHARLES E. LAHMERS.

Witnesses:
    JAMES A. D. RICHARDS,
    W. I. KINSEY.